Sept. 11, 1962 J. KUNSCH ETAL 3,053,550
WHEEL CHAIR PROPULSION AND BRAKING ARRANGEMENT
Filed May 25, 1960 3 Sheets-Sheet 1
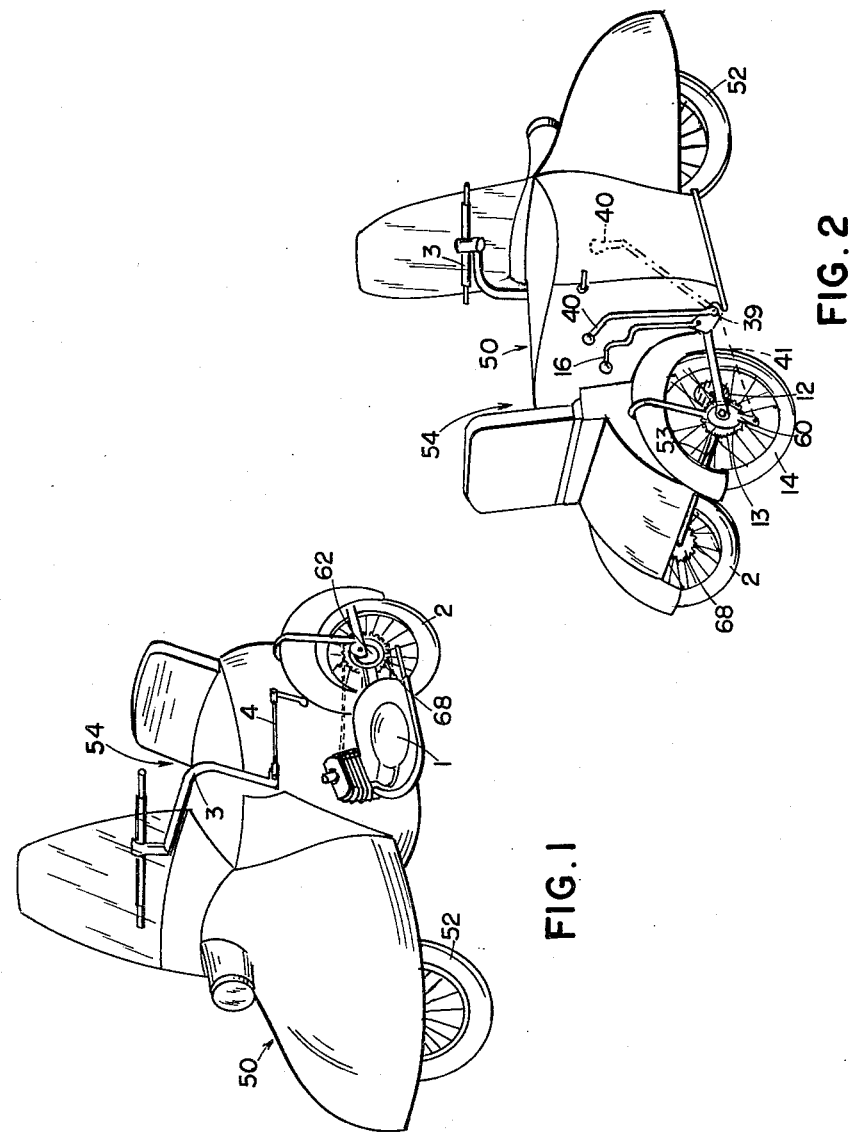
INVENTORS:
Joachim Kunsch
Paul Stolarski INVENTORS:
Joachim Kunsch
Paul Stolarski

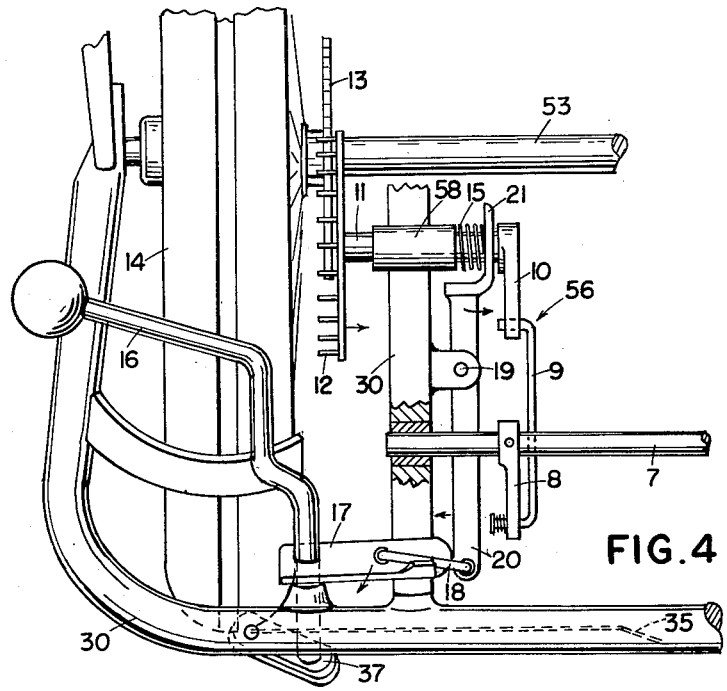
FIG.4
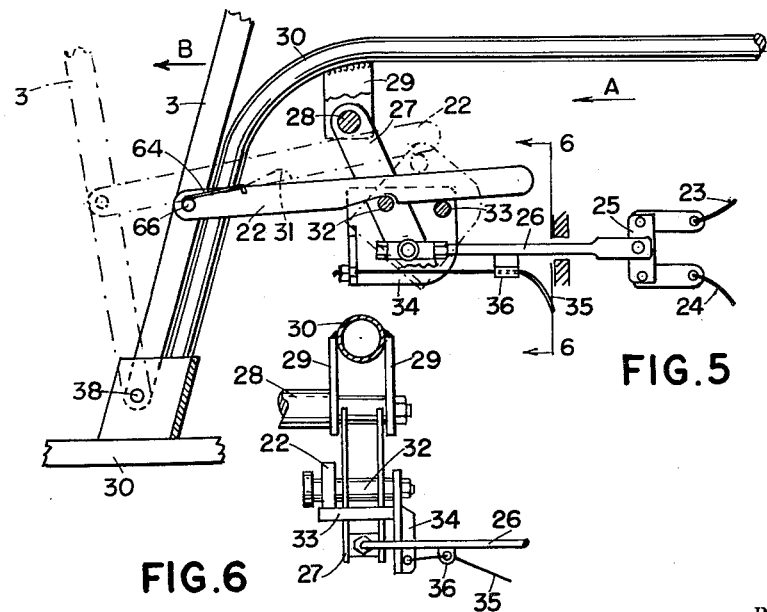
FIG.5
FIG.6
INVENTORS:
Joachim Kunsch
Paul Stolarski

United States Patent Office 3,053,550
Patented Sept. 11, 1962

3,053,550
WHEEL CHAIR PROPULSION AND
BRAKING ARRANGEMENT
Joachim Kunsch, Geibelstrasse 44, Leipzig N. 22, Germany, and Paul Stolarski, Fr.-Ebert-Strasse 122, Leipzig C. 1, Germany
Filed May 25, 1960, Ser. No. 31,683
6 Claims. (Cl. 280—248)

The present invention relates in general to vehicles, and in particular to a new and useful wheel chair for sick people or invalids which may be either driven by motor or manually.

The present invention is particularly applicable to wheel chairs of a type comprising a single lever for propelling and braking the chair by the force of the muscles. The lever is moved backwardly and forwardly and is connected to a shaft of one of the wheels by suitable mechanism to convert the back and forth motion into rotary motion of the wheels. A disadvantage of previous devices of this character was that an invalid upon entering the vehicle, was liable unvoluntarily to move the propelling lever and make the vehicle roll along.

According to the invention, the lever is coupled to the wheel by mechanism including a lever with a locking device which is set by a lever arm which blocks the entrance to the vehicle when the lock is not set.

In previously used embodiments of the wheel chair, a wheel without teeth was provided with a perforated disc for engagement with a slidable pin connected to the crank drive, which pin could be moved by a cable connection by means of a hand lever.

A wheel chair constructed in accordance with the present invention includes a conventional hand-driven toothed rear wheel which can be exchanged with a motor-driven drive wheel provided with a similar gear, so that for both rear wheels the same spare wheel can be used. The exchangeability of the two rear wheels is of interest for the reason that gear wheel and tire of the motor-driven rear wheel is subjected to higher wear than that of the hand-driven wheel. Furthermore, with the new construction, a coupling with the drive wheel is possible in any position of the wheel. In the known construction, coupling was more difficult. Moreover, a coupling with gears is cheaper and simpler than one with a pin.

In the known devices, braking was effected by pulling in of the propulsion lever toward the body of the user of the wheel chair. In the present construction, however, a push-and-return rod or lever is provided which the user has to push away from the body for braking. In this manner, a greater force can be brought to bear on the lever and the user may also lean against the back rest while pushing. In the old construction such leaning was not possible, a particular disadvantage for invalids whose legs had been amputated.

The invention further consists in the arrangement of a braking lever pivotally mounted on a horizontal shaft which lever projects, when the brake is released, into the opening through which the user enters the chair. Thus, the user can only get into the chair when it is braked. This is another important advantage for leg amputees who have to lean on the chair, or the propulsion lever, when getting in. This, however, is only safe and accident-proof when the chair is prevented by the brake from rolling along. In the novel arrangement, the propulsion lever will also set the brake when it is in a position far to the front. With the lever in this position, the room for entering the chair is as large, and getting in as comfortable, as possible.

Finally, the invention also relates to the means which, upon actuation of the coupling mechanism, will simultaneously effect engagement or disengagement of the propulsion lever and the brake.

An object of this invention is to provide an improved wheel chair. A further object is to provide a wheel chair including a push rod for propulsion which is pivoted to the forward end of the frame and includes means connected thereto for setting the brakes.

A further object is to provide a wheel chair having a brake lever which blocks entrance to the vehicle whenever the brakes are not set.

A further object is to provide a wheel chair which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a side perspective view of a wheel chair constructed in accordance with the invention viewed from the motor-driven left side;

FIG. 2 is a side perspective view of the manually-driven right side;

FIG. 4 is an enlarged fragmentary perspective top plan view of the hand-driven rear wheel part;

FIG. 5 is an enlarged fragmentary side view of the means for engagement between propulsion lever and brake; and FIG. 6 is a fragmentary section taken along the line 6—6 of FIG. 5.

Figure 3:
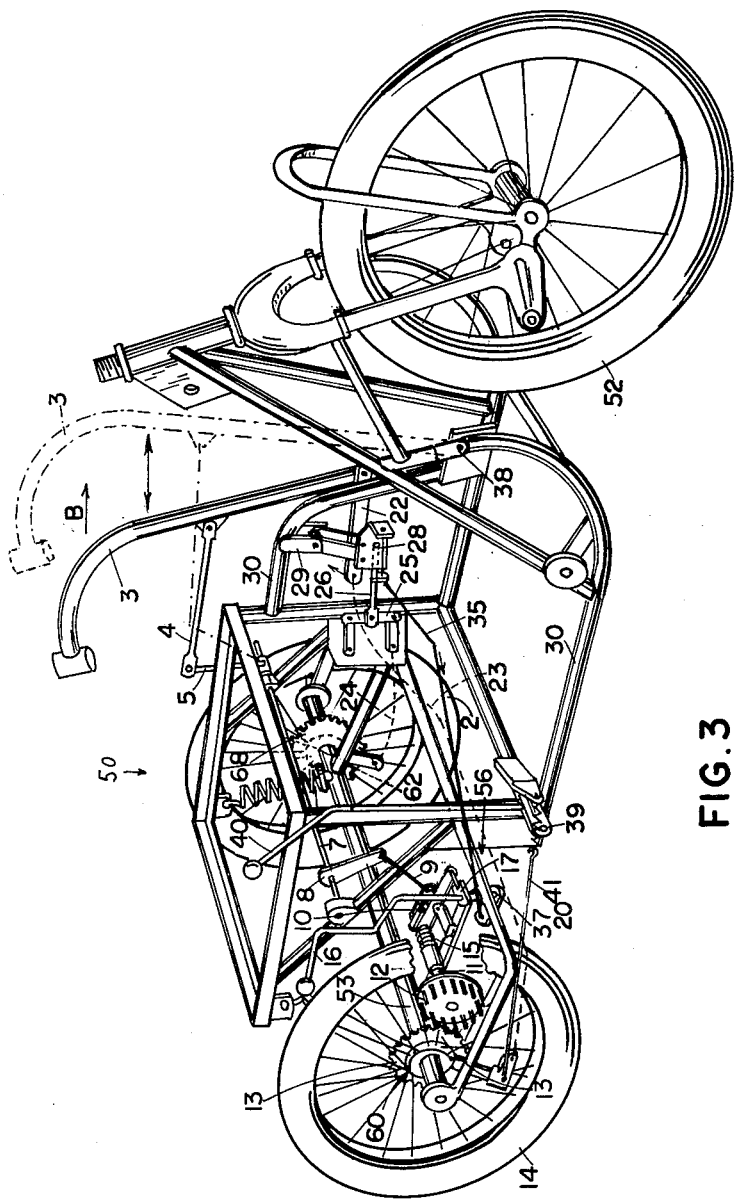
FIG. 3 is an enlarged perspective view of the chair with seat and covering panels removed, again viewed from the manual drive side.

Referring to the drawings, in particular the invention embodied therein comprises a tricycle wheel chair 50 including a single front wheel 52, and two rear wheels 2 and 14 on the respective left and right sides of the wheelchair. The wheels 2 and 14 are secured to the ends of a rear axle 53. The tricycle 50 includes a seat or chair 54, and it may be driven by a motor 1 laterally placed and exposed to the air flow, which drives the left-side rear wheel 2 through a conventional mechanism such as a sprocket wheel 68; or by a manually operated push rod or push and return rod 3 which drives the hand driven right-side rear wheel 14 by way of a novel driving linkage generally designated 56 (FIGS. 3 and 4).

The linkage 56 includes lever 4 pivotally connected to push rod 3 and to a lever 5, the horizontal crank shaft 7, lever 8, coupling lever 9, crank lever 10, horizontal shaft 11, and engageable gears 12, 13. Shaft 11 is slidably mounted on bearing 58 (FIG. 4). As can best be seen from FIG. 4, the pivotal motion imparted to push rod 3 is transmitted to the coupling lever 9, interconnecting the lever 8 with the crank lever 10 rigid with the gear shaft 11. The distance between the axes of shafts 7 and 11, their relative positions, and the lengths of levers 8 and 10 are chosen so that the crank lever 10 is free to perform a clockwise or anticlockwise rotation, depending on the direction in which the wheelchair is made to start its travel, while the lever 8 reciprocates along an arcuate path. The mass momentum of the wheelchair, once it has been started rolling, will aid in swinging the coupling lever 9 out of either of two dead centers of the linkage 56.

In this arrangement, shaft 11 is under the action of a return spring 15 to permit selective driving engagement and disengagement of gears 12 and 13. Shaft 11 is axially slidable by means of a hand lever 16 and lockable by rotating the lever 16 to an offset position in which gears 12 and 13 are disengaged. Lever 16 carries a wedged-on lever 17 which is pivotally connected to link 18, and thereafter to double lever 20. The double lever 20 is rockably mounted on bolt 19 of the frame 30 and it grips shaft 11 by means of a fork 21. The return spring 15 tends to disengage the gears 12 and 13 by urging shaft 11 to the right, as viewed in FIG. 4, in which the gears are shown in the aligned engaging condition. The disengaged condition is visible in FIG. 3. The left-side wheel 2 is shown in FIG. 3 with the sprocket wheel or gear 68 for the motor drive (not shown in detail). This wheel assembly is identical with that of the right-side, hand propelled wheel 14 and its gear 13, so that the assemblies may be easily interchanged, e.g. to compensate for uneven wear.

The wheels 2, 14 with their respective sprocket gears 68, 13 may be easily interchanged if the former should be worn out by the motor drive 1.

The push rod 3 is pivotally connected to the frame 30 at the bottom end at the location of a pivot bolt 38 (FIG. 5). Pivotally mounted on the push rod 3 intermediate its length is a lever 22 having a lower recess 31. The lever 22 serves as a connecting means with two brake cables 23 and 24 which in turn provide connection with rear wheel brake drums 60 and 62 of wheels 14 and 2, respectively. The cables are connected by way of an equalizing double lever 25 and link 26 to one end of a lever 27 which is rockably mounted on a bolt 28. Bolt 28 is supported by a piece 29 welded to the chassis frame 30. A horizontal pin 32 is welded to the lever 27 and it engages with the recess 31 of lever 22 when the chair is to be braked. The rod 3 is then pushed in the direction of arrow B away from the body of the user, and the brake is applied by the pin 32 urging lever 26 and cables 23 and 24 in the direction of arrow B to tighten the brakes.

When the rod is to be used for disengaging the brake and for making the wheel chair movable once more, this is done by a horizontal pin 33 which acts on lever 22 from below. Pin 33 is fastened to a disc 34 acting as a double lever which is rockably mounted on pin 32. A Bowden cable 35 acts on the disc from the other end which is connected to link 26 through an eye 36. The Bowden cable is connected to a lever 37 wielded to hand lever 16 (FIGURE 4) in such a manner that upon engagement of gears 12 and 13 pin 32 is disengaged from recess 31 and the rod 3 can again be used for propelling the chair. A spring 64 pivoted at 66 on the push rod 3 urges the lever 22 clockwise toward engagement of recess 31 with pin 32. Rod 3 is mounted on the horizontal bolt 38 (the adjacent portions of frame 30 and the steering mechanism being omitted in FIG. 3) far out to the front on the frame of the chassis, so that it may be positioned in the forward dotted line position in FIGURE 3 to permit free access to the vehicle. At the side on which the user enters, that is, the right-hand side with the hand drive, a hand lever 40 is rockably mounted on a horizontal bolt 39 (see FIGS. 2 and 3), and this lever serves to operate the locking brake by moving a link 41 connected to the rear wheel 14. When the brake is released, the lever 40 blocks the entry and prevents the user both from getting in or out. In FIG. 2, lever 40 is shown in the blocking position while in FIG. 3 the brake is locked and lever 40 is swung out of the path of the user.

While a specific embodiment of the invention has been shown and described in detail to illustrate the application of the invention principles, it will be understood that the invention may be embodied otherwise without departing from such principles.

What is claimed is:

1. A wheel chair for invalids, including a frame having a seat, a rear axle, a wheel mounted on each end of said axle, a drive shaft for propelling said wheel chair, gear means on at least one of said wheels connectable to said drive shaft, an upstanding push rod pivotally connected to the lower portion of said frame well forward of said seat so as to permit a person to enter said seat without obstruction by said push rod, drive means interconnecting said push rod and said drive shaft to rotate said shaft upon reciprocation of said push rod by said person, control means pivotally mounted on said frame and connected to said drive shaft for selective engagement and disengagement of said shaft with respect to said wheel gear means by axially shifting said drive shaft, brake means connected to said wheels and said push rod including means to set said brakes when said push rod in in a forward position, and separate lever means pivotally connected to said frame and to said brake means, said lever means being movable from a brake locking position adjacent said seat to a brake releasing position in which said lever means blocks the entrance to said vehicle forwardly and sideways from said seat.

2. A wheel chair according to claim 1, further including means connecting said control means and said brake means and effective to release said brake means upon engagement of said drive shaft with said wheel gear means.

3. A wheel chair according to claim 2 wherein said brake means includes an arm pivotally mounted intermediate the height of said push rod, an arm member slidably mounted on said frame, cable means connecting said arm member to each of said wheels, said brake means being connected to the respective one of each of said cables, said arm having a notch portion engageable with an outstanding portion of said arm member whereby to move said arm member and exert tension on said cables when said push rod is moved into a forward position.

4. A wheel chair according to claim 3, including a brake control lever pivotally mounted on said frame, connected to said brake means and including means to release said arm from said arm member when said brake means is released.

5. A wheel chair for an invalid person, including a frame having a seat and an access opening forwardly and sideways of said seat for access thereto, a rear axle, a pair of identical and interchangeable wheels mounted on each end of said axle, a sprocket wheel attached to each of said wheels, a drive shaft, gear means connecting said drive shaft and the sprocket wheel of one of said wheels, the sprocket wheel of the other wheel being adapted to be driven by power means optionally attachable to the wheel chair, a push rod pivotally connected to said frame adjacent the lower end thereof, in front of said seat and forward of said access opening, linkage means connecting said push rod and said drive shaft for imparting the latter a rotational torque upon reciprocation of said push rod by said person, and lever means for coupling and uncoupling said gear means with the sprocket wheel of said one wheel.

6. A wheel chair for an invalid person, including a frame having a seat and an access opening forwardly and sideways of said seat for access thereto, a rear axle, a pair of wheels mounted on each end of said axle, a drive shaft, gear means connecting said drive shaft and at least one of said wheels, a push rod pivotally connected to said frame adjacent the lower end thereof, in front of said seat and forward of said access opening, linkage means connecting said push rod and said drive shaft for imparting the latter a rotational torque upon reciprocation of said push rod by said person, lever means for coupling and uncoupling said gear means with said wheels, brake means for said wheels, a braking lever connected to said frame adjacent said seat and movable to a position blocking said access opening when releasing said brake means, and means in operative connection with said push rod for setting said brake means when said push rod is in a forward position.

References Cited in the file of this patent

UNITED STATES PATENTS

| 704,156 | Weeber | July 8, 1902 |
| 892,384 | Smith | June 30, 1908 |
| 1,284,169 | Allen | Nov. 5, 1918 |
| 1,440,296 | Hokamp | Dec. 26, 1922 |
| 1,605,750 | McCarty | Nov. 2, 1926 |

FOREIGN PATENTS

| 861,627 | France | Nov. 4, 1940 |